Patented May 17, 1938

2,117,291

UNITED STATES PATENT OFFICE 2,117,291

PARA-XENYL PHOSPHORIC ACID DERIVATIVES

Edgar C. Britton and Shailer L. Bass, Midland, Mich., assignors to The Dow Chemical Company, Midland, Mich., a corporation of Michigan No Drawing. Application January 13, 1936, Serial No. 58,927

14 Claims. (Cl. 260—99.20)

This invention concerns certain new organo-derivatives of phosphoric acid and para-phenyl-phenol. The characteristic diphenyl or phenyl-phenyl group, $C_6H_5.C_6H_4$—, as well as the phenyl-phenoxy group, $C_6H_5.C_6H_4O$—, which are present in these compounds are also known as the "xenyl" and "xenoxy" groups, respectively, which latter terms we prefer to use in this application to avoid confusion of nomenclature. Said new compounds have the general formula,

wherein Y and Z each represent halogen or an aryloxy group other than the ortho-xenoxy group. The invention, then, consists in the group of new compounds comprising para-xenyl phosphoric acid halides and tri-aryl-phosphates containing from one to three para-xenyl groups.

The mixed tri-aryl-phosphates having the above general formula are prepared by reacting a phosphorus oxyhalide successively with para-xenol or an alkali salt thereof and at least one other phenolic compound, e. g. phenol, alkyl phenol, halo-phenol, naphthol, guaiacol, meta-xenol, etc., or the alkali metal salts thereof. The order in which the different phenolic compounds are reacted is immaterial, although we find it convenient first to react the phosphorus oxyhalide with the proportion of para-xenol necessary to form a para-xenyl phosphoric acid di-halide, or a di-(para-xenyl) phosphoric acid mono-halide, as desired, and thereafter to react such acid halide with a different phenolic compound to form the desired mixed tri-aryl-phosphate product. Tri-(para-xenyl) phosphate is prepared by reacting sufficient para-xenol with a phosphorus oxyhalide to form the desired product.

The above reactions are carried out by heating a mixture of the appropriate materials to a reaction temperature, preferably in the presence of a reaction catalyst, such as metallic calcium, magnesium, or aluminum, a chloride of magnesium, aluminum, or iron, etc. The temperature of the reaction is, of course, dependent in any particular case upon the reactants employed, the relative proportions thereof, the presence or absence of a catalyst, etc. Since, however, the reaction is accompanied by an evolution of hydrogen halide when the phenols themselves are used, it is usually sufficient merely to heat the reaction mixture to a temperature at which hydrogen halide is evolved. The reactions are preferably carried out at the most convenient reaction temperature, usually below 200° C., since at higher temperatures by-product formation may occur to an objectionable extent.

In forming a mixed tri-aryl-phosphate the intermediate para-xenyl phosphoric acid halide products may be separated as such, e. g. by fractionally distilling the reaction mixtures in which they are formed. However, we find it convenient after formation of such intermediate acid halide to add the desired quantity of a second phenolic compound, e. g. phenol, to the crude reaction mixture and to continue the reaction to form the tri-aryl-phosphate product before attempting any purification. By operating in such manner, the extra steps involved in separating the intermediate acid halide product are avoided.

Following completion of the heating step in the preparation of the tri-aryl-phosphates, air is preferably bubbled through the hot reaction mixture to remove hydrogen halide and other volatile impurities therefrom. The mixture is usually fractionally distilled to separate the tri-aryl-phosphate product.

The following equations showing the preparation of (1) a para-xenyl phosphoric acid di-halide, (2) a di-(para-xenyl) phosphoric acid mono-halide, (3) di-(para-xenyl)-phenyl phosphate, and (4) tri-(para-xenyl) phosphate are illustrative of the type of reactions involved in operating according to the procedure described above:—

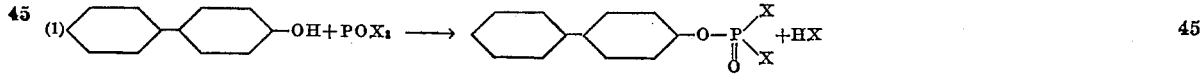

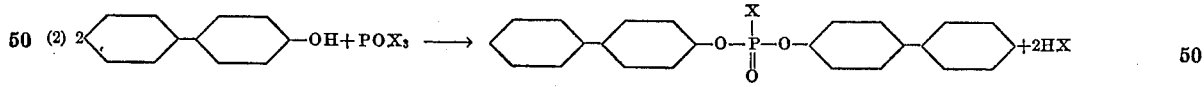

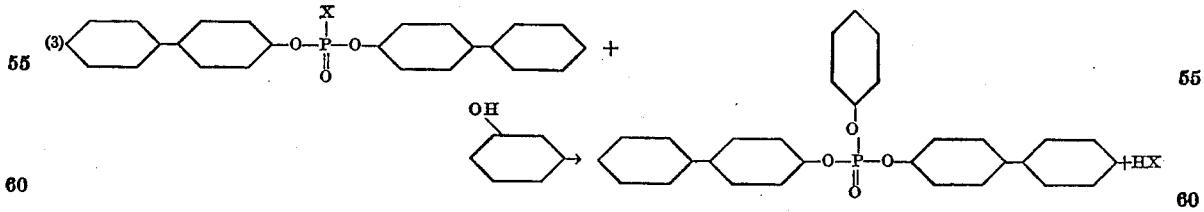

(4)

$$3 \langle \text{phenyl} \rangle-\langle \text{phenyl} \rangle-\text{OH} + \text{POX}_3 \longrightarrow$$
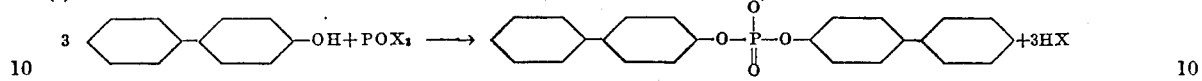$+3\text{HX}$ In the above equations X represents halogen.

The following examples are illustrative of certain ways in which we carry out our invention, but are not to be construed as limiting the same:—

Example 1

A mixture of 340 grams (2 moles) of paraxenol and 1381 grams (9 moles) of phosphorus oxychloride was heated to a temperature between 78° and 96° C. for about 14.25 hours, i. e. until hydrogen chloride was no longer evolved from the mixture. The latter was then fractionally distilled, first at atmospheric pressure until the unreacted phosphorus oxychloride had been removed, and thereafter under reduced pressure. There was obtained 1017.2 grams (6.6 moles) of unreacted phosphorus oxychloride, 479.6 grams (1.67 moles) of para-xenyl phosphoric acid dichloride, and 63.1 grams of higher boiling materials. Paraxenyl phosphoric acid di-chloride is a white crystalline compound, having the boiling point 211°–223° C. at 12 to 13 millimeters pressure, the melting point 83° C., and the formula,

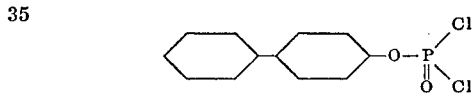

Example 2

A mixture of 510 grams (3 moles) of para-xenol, 155 grams (1 mole) of phosphorus oxychloride, and 5 grams of anhydrous magnesium chloride was heated with stirring at temperatures gradually increasing from 65° to 160° C. for 5 hours. Hydrogen chloride and other volatile impurities were then blown out of the reacted mixture with air and said mixture was dissolved in an excess of hot carbon tetrachloride. This solution was filtered to remove insoluble by-products, catalyst, etc., and then fractionally distilled to remove the carbon tetrachloride therefrom. 490 grams (0.88 mole) of a tri-(para-xenyl) phosphate product was thereby obtained as a residue. This compound is a white crystalline solid, insoluble in water and soluble in most organic solvents. It has a melting point of 137.5° C., and the formula,

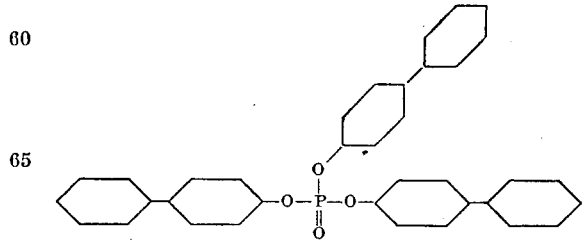

Example 3

A mixture of 143.5 grams (0.5 mole) of para-xenyl phosphoric acid di-chloride, 100 grams (1.06 moles) of phenol, and 1 gram of anhydrous magnesium chloride was heated with stirring at temperatures gradually increasing from 76° to 162° C. for 8 hours. Hydrogen chloride and other volatile impurities were then blown out of the mixture with air. The reacted mixture was dissolved in 250 grams of orthodichlorobenzene and the resultant solution washed successively with dilute hydrochloric acid, dilute aqueous sodium hydroxide solution, and water. This solution was fractionally distilled under vacuum, whereby 173.5 grams (0.43 mole) of para-xenyl-di-phenyl phosphate was separated. Said compound is a white crystalline solid, having a boiling point of approximately 302°–309° C., at 10 millimeters pressure, a specific gravity of 1.194 at 70°/4° C., the melting point 63° C., and the formula,

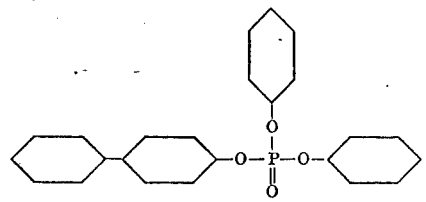

Example 4

A mixture of 105.5 grams (0.5 mole) of phenyl phosphoric acid di-chloride, 175 grams (1.03 moles) of para-xenol, and 1 gram of anhydrous magnesium chloride was heated with agitation to a temperature between 84° and 156° C. for 8.5 hours. The reacted mixture was blown with air to remove hydrogen chloride and other volatile impurities, dissolved in 250 grams of orthodichlorobenzene, and washed successively with dilute aqueous hydrochloric acid, dilute aqueous sodium hydroxide solution, and water. The resulting solution was then fractionally distilled under vacuum to obtain 190 grams (0.39 mole) of a phenyl-di-(para-xenyl) phosphate product. This compound is a white crystalline solid boiling at 360°–361° C. at 7.6 millimeters pressure, melting at 88°–90° C., and having the formula,

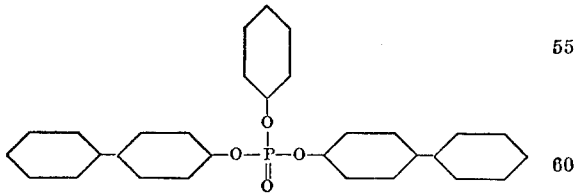

Example 5

A mixture of 170 grams (1 mole) of para-xenol, 153.4 grams (1.0 mole) of phosphorus oxychloride, and 2 grams of anhydrous magnesium chloride was heated for 2.5 hours at temperatures gradually increasing from 80° to 92° C., with stirring. The resulting reacted mixture was a viscous red oil containing as a major constituent para-xenyl phosphoric acid di-chloride. Without any preliminary purification of said crude product, 216 grams (2 moles) of ortho-cresol was added thereto and heating and stirring continued for a period of 10 hours, the temperature being gradually increased from 92° to 176° C. The reacted mixture, weighing 426.7 grams, was then blown with air to remove hydrogen chloride and other volatile impurities and dissolved in 500 grams of orthodichlorobenzene. This solution was washed successively with dilute hydrochloric acid, dilute aqueous sodium hydroxide solution, and water, and fractionally distilled under reduced pressure, thereby obtaining 119.5 grams (0.32 mole) of tri-(ortho-cresyl) phosphate, 25.6 grams (0.046 mole) of tri-(para-xenyl) phosphate, 192 grams (0.446 mole) of di-ortho-cresyl)-para-xenyl phosphate, and 89.5 grams (0.18 mole) of ortho-cresyl-di-(para-xenyl) phosphate.

Di-(ortho-cresyl)-para-xenyl phosphate is a colorless viscous liquid, having a boiling point of 303° to 305° C. at 7.6 millimeters pressure, the specific gravity 1.176 at 60°/4° C., and the formula,

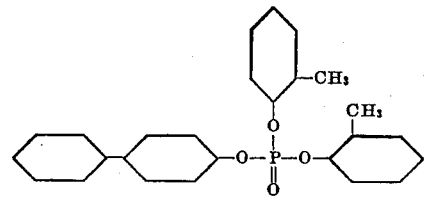

Ortho-cresyl-di-(para-xenyl) phosphate is a colorless viscous liquid, having a boiling point of 353° C. at 6 millimeters pressure, the specific gravity 1.118 at 60°/4° C., and the formula,

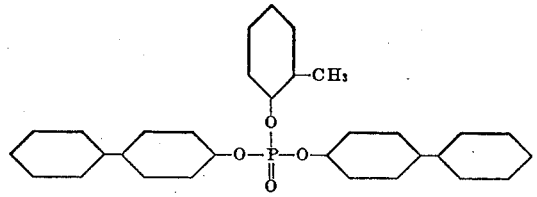

Example 6

A mixture of 265 grams (1.56 moles) of para-xenol, 235 grams of a beta-naphthyl phosphoric acid di-chloride product containing approximately 82 per cent of the pure di-halide, and 1 gram of anhydrous magnesium chloride was heated with stirring at temperatures gradually increasing from 70° to 165° C. for 8.75 hours. Hydrogen chloride and other volatile impurities were then blown out of the reacted mixture with air and said mixture was dissolved in 800 grams carbon tetrachloride. This solution was filtered to remove insoluble by-products, catalyst, etc., and then fractionally distilled to remove the carbon tetrachloride therefrom. 402 grams (0.76 mole) of a beta-naphthyl-di-(para-xenyl) phosphate product was thereby obtained as a residue. This compound is a very viscous liquid having a refractive index ($n$/D) of 1.6377 at 60° C., a specific gravity of 1.216 at 60°/4° C., and the formula,

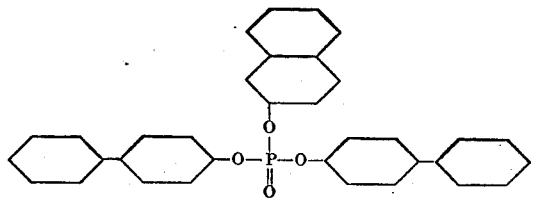

Example 7

A mixture of 88.8 grams (0.31 mole) of para-xenyl phosphoric acid di-chloride, 76.8 grams (0.62 mole) of guaiacol and 0.5 gram of anhydrous magnesium chloride was heated at a temperature of 106° to 160° C. for 11 hours. Hydrochloric acid gas and other volatile impurities were then vaporized out of the heated mixture with air. The reaction mixture was dissolved in 300 grams of carbon tetrachloride, successively washed with dilute hydrochloric acid, dilute aqueous sodium hydroxide, and water, and fractionally distilled under vacuum. 51.3 grams (0.111 mole) of para-xenyl-di-(ortho-methoxy-phenyl) phosphate was thereby obtained as a colorless viscous liquid having a specific gravity of 1.246 at 60°/4° C., a boiling point of approximately 327° C. at 12 millimeters pressure, and the formula,

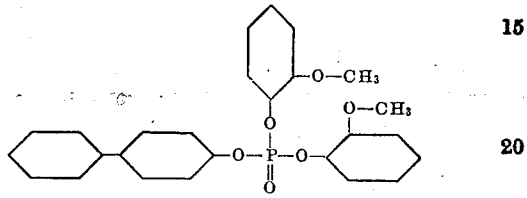

In a similar manner a para-xenyl phosphoric acid di-halide may be reacted with another phenolic compound, e. g. cresol, etc., to form mixed acid halides such as para-xenyl-cresyl phosphoric acid mono-halide. This compound in turn may be further reacted with an additional phenolic compound, e. g. phenol, etc., to form mixed tri-aryl-phosphate compounds such as para-xenyl-cresyl-phenyl phosphate in which the substituting aryl groups all differ one from the other.

Instead of employing phosphorus oxychloride as a reactant in preparing our products, we may employ phosphorus oxybromide, in which case our intermediate para-xenyl acid halides are the bromides. For instance, phosphorus oxybromide may be reacted with 1 or 2 moles of para-xenol to form para-xenyl phosphoric acid di-bromide and di-(para-zenyl) phosphoric acid mono-bromide, respectively. Either of these acid bromides may be reacted with any other phenolic compound or its salts, e. g. cresol, sodium tertiary butyl phenolate, etc., to form a tri-aryl-phosphate of the present class. The procedure involved in carrying out such reactions is similar to that hereinbefore described.

Our para-xenyl phosphoric acid halides and tri-aryl-phosphate products containing the para-xenyl group are insoluble in water, soluble in most organic solvents, odorless, unaffected by heat, and resistant to hydrolysis and oxidation. Upon prolonged heating with sodium hydroxide they break down to yield ortho-phosphoric acid and phenolic derivatives comprising para-xenol. The acid halides are useful as intermediates for the preparation of a wide variety of organo-phosphates containing the para-xenoxy radical, e. g. mixed tri-aryl-phosphates of the present class, etc. The new tri-aryl-phosphates herein disclosed are substantially non-flammable and are useful as plasticizers, fire-proofing agents, etc., in cellulose acetate and nitrocellulose compositions, varnishes, etc.

Other modes of applying the principle of our invention may be employed instead of those explained, change being made as regards the method or compounds herein disclosed, provided the steps or compounds stated by any of the following claims or the equivalent of such stated steps or compounds be employed.

We therefore particularly point out and distinctly claim as our invention:—

1. In a method of preparing an organo-derivative of phosphoric acid having the general formula,

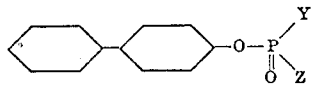

wherein Y and Z each represent a member of a group consisting of halogen and the aryloxy groups other than ortho-xenoxy, the step which consists in reacting a phosphorus oxyhalide with a compound selected from the class consisting of para-xenol and alkali metal salts thereof.

2. In a method of preparing an organo-derivative of phosphoric acid having the general formula,

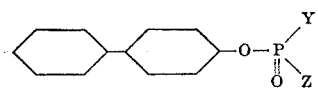

wherein Y and Z each represent a member of the group consisting of halogen and aryloxy groups other than ortho-xenoxy, the step which consists in heating phosphorus oxychloride to a reaction temperature with para-xenol in the presence of a catalyst selected from the class consisting of the chlorides of the metals magnesium, aluminum, and iron.

3. In a method of making a compound having the general formula,

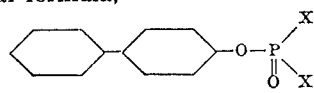

wherein X represents halogen, the step which consists in heating a phosphorus oxyhalide to a reaction temperature with approximately a molecular equivalent of a compound selected from the class consisting of para-xenol and alkali metal salts thereof.

4. In a method of making para-xenyl phosphoric acid dichloride, the step which consists in heating phosphorus oxychloride to a reaction temperature with approximately a molecular equivalent of para-xenol.

5. In a method of making a compound having the general formula,

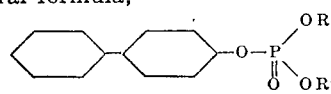

wherein R and R' represent aromatic hydrocarbon radicals other than the ortho-xenyl radical, the steps which consist in heating a phosphorus oxyhalide to a reaction temperature with not more than twice its molecular equivalent of a compound selected from the class consisting of para-xenol and alkali metal salts thereof, to form a para-xenyl phosphoric acid halide and heating the latter to a reaction temperature with another phenolic compound other than ortho-xenol to form a mixed tri-aryl-phosphate.

6. In a method of making a compound having the general formula,

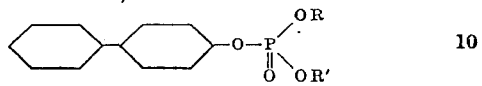

wherein R and R' represents aromatic hydrocarbon radicals, the step which consists in heating a para-xenyl phosphoric acid halide to a reaction temperature with another phenolic compound other than ortho-xenol to form a mixed tri-aryl-phosphate.

7. In a method of making tri-para-xenyl phosphate, the step which consists in heating phosphorus oxychloride to a reaction temperature with approximately 3 molecular equivalents of para-xenol.

8. In a method of making para-xenyl-di-phenyl phosphate, the step which consists in heating para-xenyl phosphoric acid di-chloride to a reaction temperature with approximately 2 molecular equivalents of phenol.

9. In a method of making para-xenyl-di-(ortho-cresyl) phosphate, the step which consists in heating para-xenyl phosphoric acid dichloride to a reaction temperature with approximately 2 molecular equivalents of ortho-cresol.

10. An organo-derivative of phosphoric acid having the general formula,

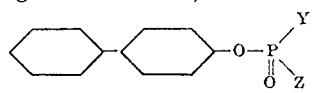

wherein Y and Z each represent a member of the group consisting of halogen and the aryloxy groups other than ortho-xenoxy.

11. An organo-derivative of phosphoric acid having the general formula,

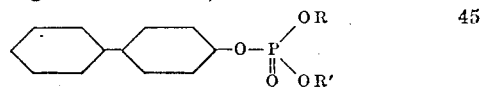

wherein R and R' represent aromatic hydrocarbon radicals other than ortho-xenyl.

12. Tri-(para-xenyl) phosphate.
13. Para-xenyl-di-phenyl phosphate.
14. Para-xenyl-di-(ortho-cresyl) phosphate.

EDGAR C. BRITTON.
SHAILER L. BASS.

CERTIFICATE OF CORRECTION.

Patent No. 2,117,291.   May 17, 1938.

EDGAR C. BRITTON, ET AL.

It is hereby certified that error appears in the printed specification of the above numbered patent requiring correction as follows: Page 3, first column, line 31, for the numeral "1.118" read 1.188; and that the said Letters Patent should be read with this correction therein that the same may conform to the record of the case in the Patent Office.

Signed and sealed this 26th day of July, A.D. 1938.

(Seal)

Henry Van Arsdale,
Acting Commissioner of Patents.